Oct. 2, 1962

R. L. TIEDE 3,056,283

APPARATUS FOR MEASURING THE VISCOSITY
OF GLASS AT HIGH TEMPERATURES

Filed June 23, 1959

INVENTOR.
RALPH L. TIEDE
BY
ATTORNEYS

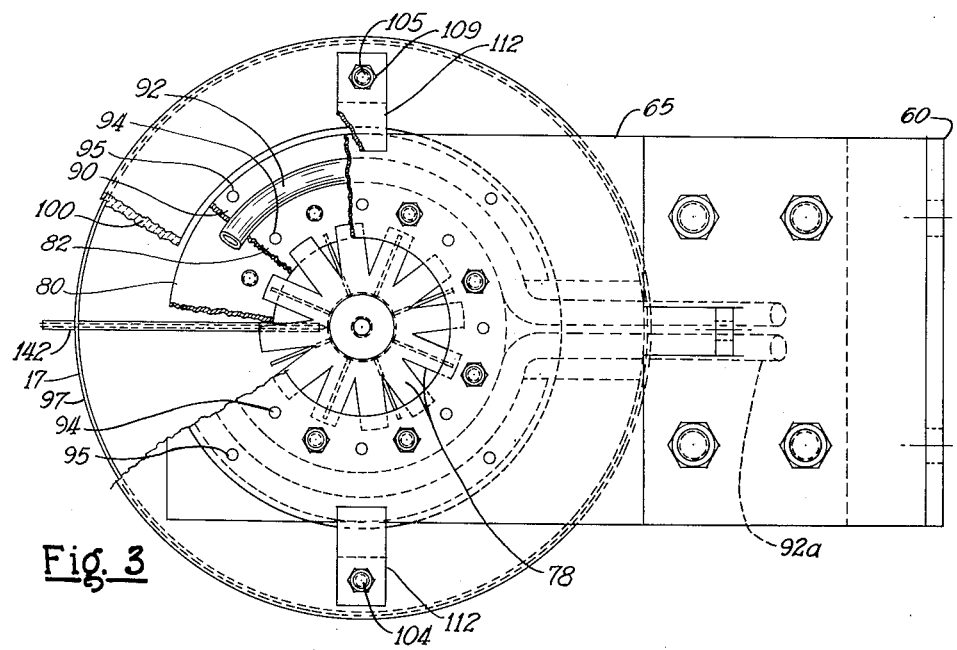
Fig. 3
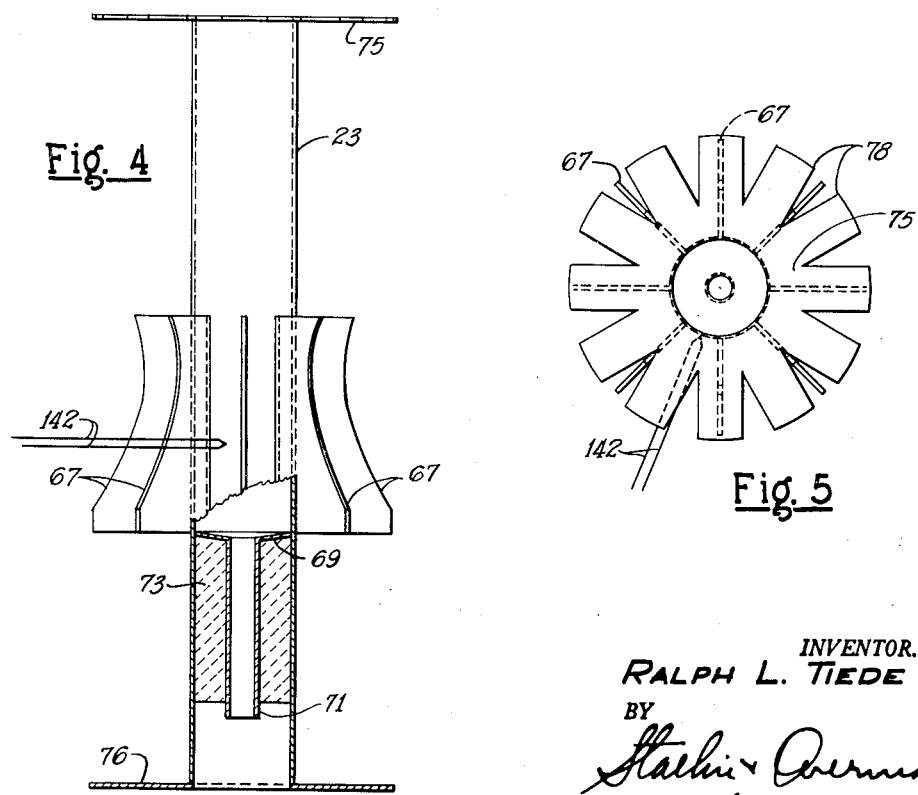
Fig. 4
Fig. 5
INVENTOR.
RALPH L. TIEDE
BY
ATTORNEYS

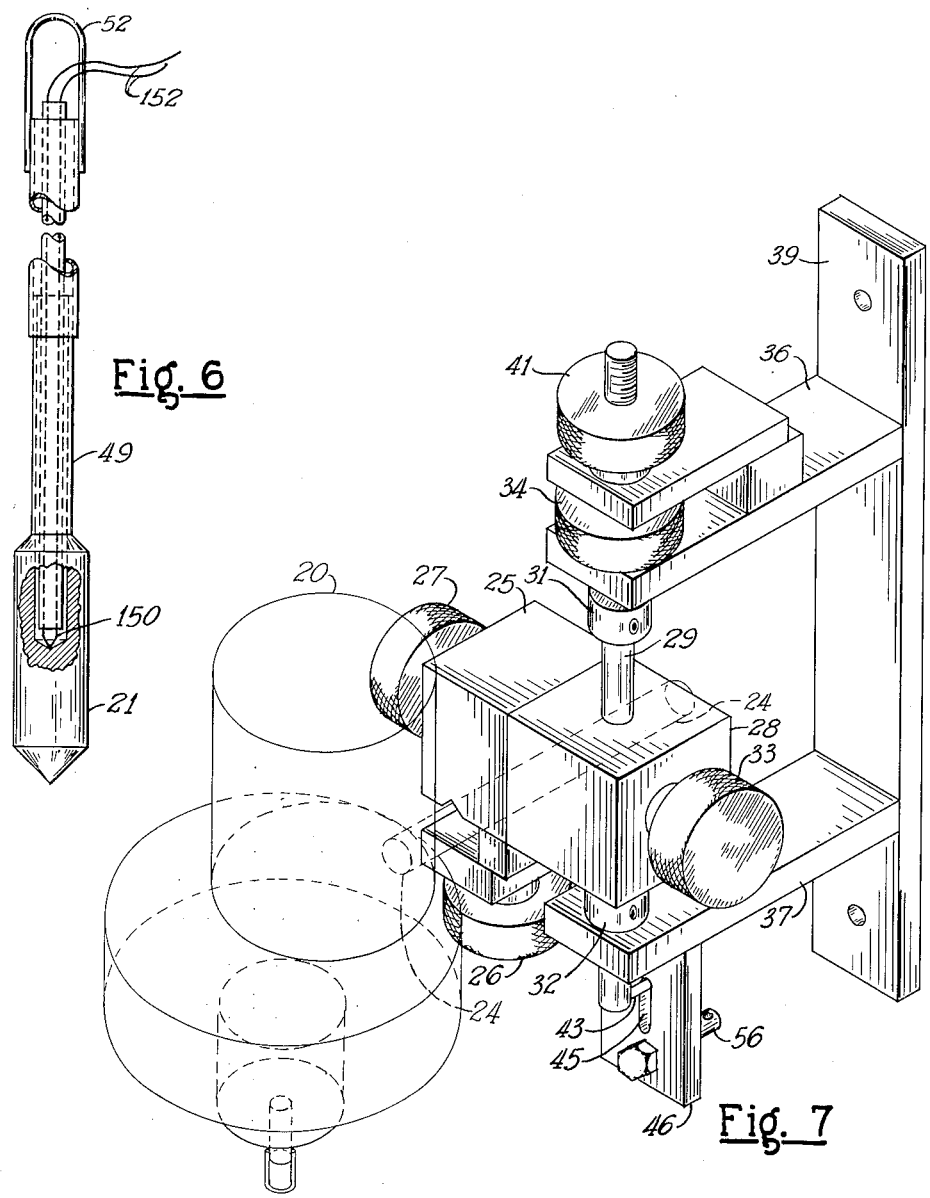

Oct. 2, 1962                    R. L. TIEDE                  3,056,283
APPARATUS FOR MEASURING THE VISCOSITY
OF GLASS AT HIGH TEMPERATURES
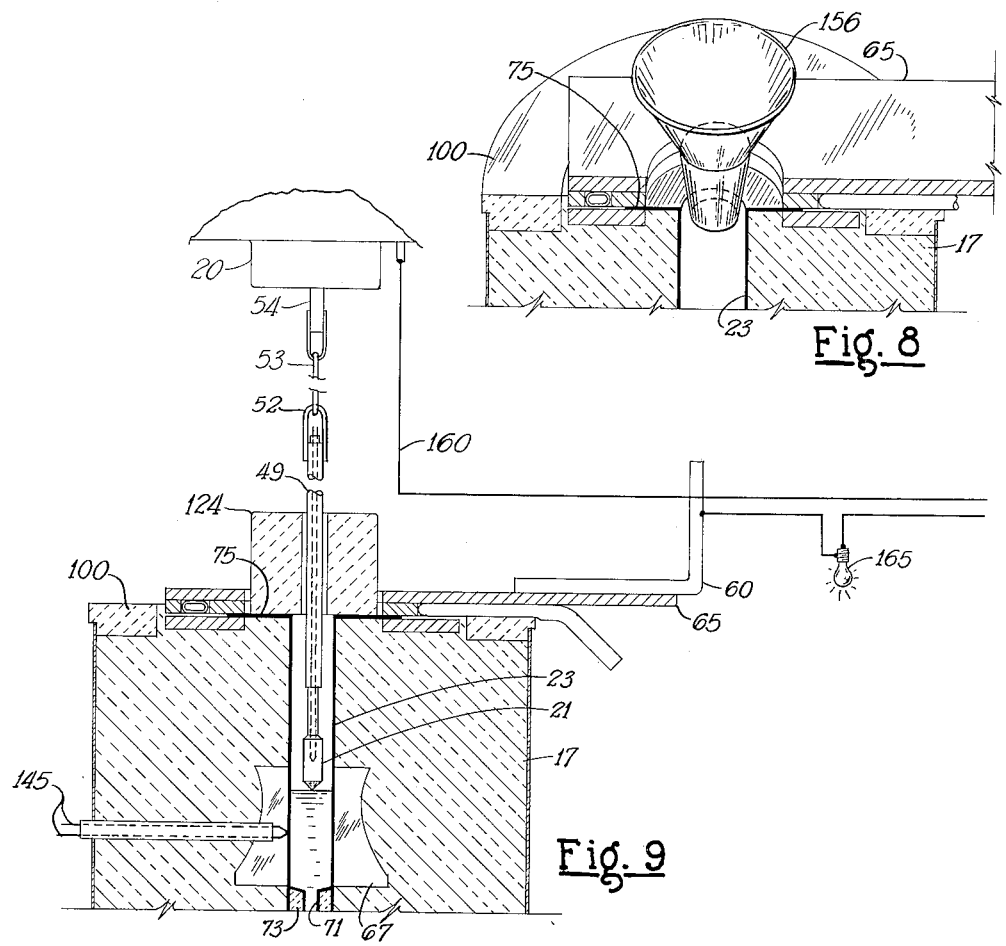
Fig. 8
Fig. 9
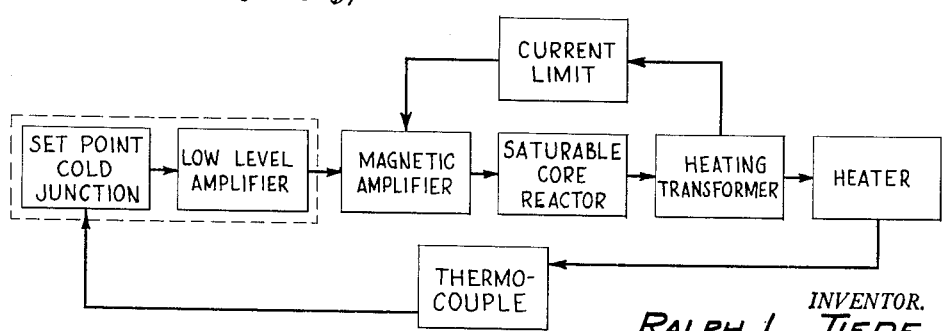
Fig. 10
INVENTOR.
RALPH L. TIEDE
BY
ATTORNEYS United States Patent Office 3,056,283
Patented Oct. 2, 1962

3,056,283
APPARATUS FOR MEASURING THE VISCOSITY OF GLASS AT HIGH TEMPERATURES
Ralph L. Tiede, Newark, Ohio, assignor to Owens-Corning Fiberglas Corporation, a corporation of Delaware
Filed June 23, 1959, Ser. No. 822,256
14 Claims. (Cl. 73—59)

This invention relates to apparatus for expeditiously and accurately determining the viscosity of molten glass.

The apparatus provided by this invention employs a rotating cylinder type of viscometer which is considered most easily applied to such measurements in glass, and one that has been found to function most dependably and with high precision.

The determination of the viscosity of glass at high temperature is a quality control check of the operating characteristics of the glass as it may be used in subsequent operations. A variation in viscosity determinations is a positive indication of a difference in chemical composition as well as of forming characteristics of the glass at production temperatures.

Experimental work in many laboratories during the past thirty years has shown that the viscosity of glass depends markedly on its chemical composition with the various ingredients individually affecting the viscosity quite differently.

Viscosity testing, besides being valuable in maintaining uniformity in production glasses, is of great importance in studying new glass compositions to discover those best adapted to particular melting and fabricating operations.

Accuracy and rapidity considerably enhance the value of viscosity checks. Precise measurements may yield additional information regarding glass formation and structure, while expediting the test procedure lessens the chance of composition change through volatilization and thereby contributes to the integrity of the findings. Fast determination of viscosity, besides reducing the direct cost of such testing, may assist in earlier solving and correction of production failures.

In the forming of glass it is essential that the molten glass from the furnace have a definite viscosity. This characteristic changes radically with temperature. The viscosity of a particular standard glass may increase threefold for each drop of 180° F. in temperature in the melting range. This means that the molten glass at 2600° F. has only one third of the viscosity of the glass at 2420° F.

A slight change from the approved degree of viscosity may make all the difference between success and failure in a glass forming operation. All of the usual processes of glass-working: blowing, pressing, drawing, and rolling, depend upon viscosity.

Viscosity is a critical factor in glass fiber forming processes, in which the relationship between temperature and viscosity is of most interest in the region where the viscosity lies in the range of 10 to 10,000 poises.

Methods and apparatus previously employed for determining the viscosities of glass stock have been oversize and cumbersome. This prior equipment, besides being high in first cost as well as maintenance expense, has required large samples of glass and considerable time for operation. The design of the former apparatus has also necessitated difficult cleaning and frequent disassembling procedures.

An object of this invention is to provide apparatus which determines viscosity by the drag effect of the molten glass on a rotating cylinder immersed therein and which requires a comparatively small quantity of the glass sample to be tested.

Another object is to provide apparatus which acts quickly and accurately in determining viscosity.

An additional important object is to provide a furnace particularly adapted to melt, hold and quickly release the glass sample under test.

A further object is to provide an apparatus which is easy to repair and low in maintenance cost because special cleaning and rebuilding is seldom required.

A still further object of this invention is to provide apparatus capable without change of components of measuring the viscosity of glass in the range of 6.5 to 13,000 poises, or roughly in the range of log viscosities from 1 to 4.11, and capable of measuring the viscosity in even a greater range by changing the size and shape of components.

An additional object is to provide a crucible for holding the glass sample which is heated as a resistor.

Another object is to provide means for accurately judging the level of the molten glass within the crucible and for immersing to an exact depth therein the cylindrical bob.

More specifically an object of the invention is to provide apparatus which requires only seventy-five grams approximately of the glass material under study.

These and other objects and features relating to the structure and control of the apparatus will be brought out more definitely in the subsequent description of a particular embodiment of the invention.

The principal features of the invention which contribute to the attainment of the forementioned objects include the utilization of the rotating cylinder measuring method; a resistance heated crucible; a radically different furnace; a carefully dimensioned cylinder bob; a precise mounting arrangement; a minimizing of time through the use of a small container which can be heated or cooled rapidly; having the glass charge small and in intimate contact with the source of heat whereby it attains the desired temperature rapidly; means for rapidly draining the crucible; and the particular design of such structural elements.

Precision of the apparatus is further enhanced through a very effective temperature controller, by precision positioning of the rotating cylindrical bob in the molten glass and by location of a measuring thermocouple inside of the spindle of the bob and a second thermocouple in contact with the crucible.

In the drawings,

FIGURE 3 is a plan view of the furnace of FIGURE 2 with portions removed or broken away;

FIGURE 4 is an enlarged elevational view with a portion shown in vertical section of the crucible of the furnace of FIGURE 2;

FIGURE 5 is a plan view of the crucible of FIGURE 4;

FIGURE 6 is an enlarged elevation of the spindle-supported bob which is adapted for rotation while immersed in molten glass in the crucible of FIGURE 4;

FIGURE 7 is an enlarged isometric view of the adjustable supporting bracket for vertically positioning the motor drive and viscosity measuring unit and the bob suspended for rotation from the unit;

FIGURE 8 is a schematic section and perspective showing of the top portion of the furnace, illustrating a funnel arrangement for facilitating the operation of placing pieces of glass cullet to be melted in the crucible;

FIGURE 9 is a schematic view, mainly in section, of the bob just contacting the surface of molten glass in the crucible and depicting an electrical circuit actuating a light signaling device through such contact; and FIGURE 10 is a simplified diagram of the electrical circuit controlling the heating of the crucible.

Figure 1:
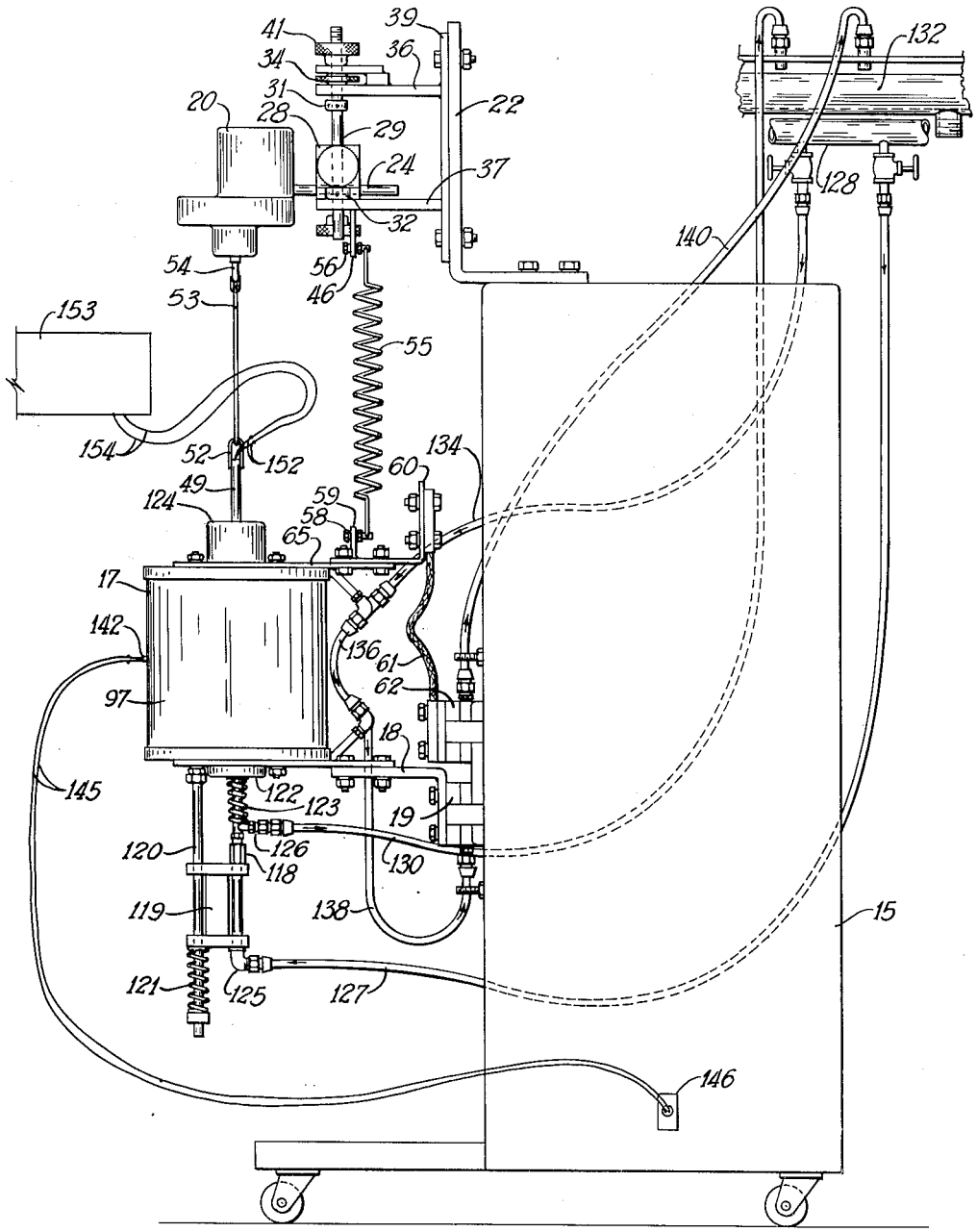
FIGURE 1 is a side elevation of apparatus embodying the viscometer of this invention.

Referring to the drawings in more detail, the apparatus of FIGURE 1, incorporating one form of this invention, includes a wheeled cabinet 15 in which is housed the electrical equipment for controlling the temperature of the furnace 17. The latter is supported by the cabinet through the bracket 18, this bracket also constituting a conductor from the transformer terminal 19 in the electrical circuit through the crucible which serves as a resistance heater within the furnace 17.

Figure 2:
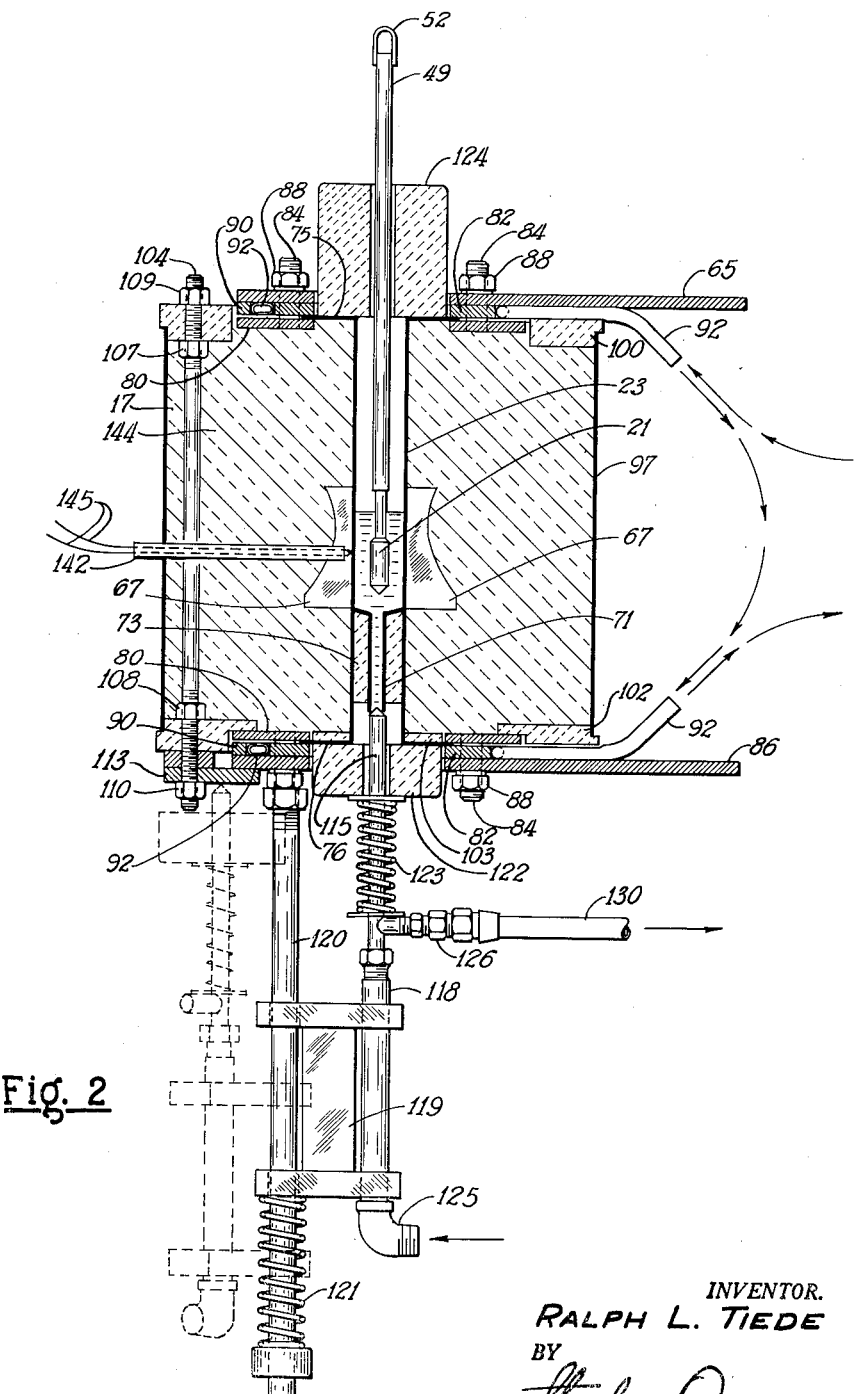
FIGURE 2 is a vertical section of the furnace assembly of the apparatus of FIGURE 1.

A commercial, torque transducer instrument 20 for measuring viscosity through the drag of the molten glass upon an immersed rotating cylinder, such as the platinum bob 21 depicted in FIGURE 2, is mounted from a bracket 22 on the top of cabinet 15. The presently preferred instrument is a Brookfield Synchro-electric viscometer, model RVT. This machine has eight different speed settings between 0.5 and 100 r.p.m.

The principle of operation of this instrument involves the simple arrangement of rotating a cylinder or disc in the fluid under test. The cylinder, in this case, is driven through a beryllium-copper spring. The deflection of the spring resulting from the viscosity drag upon the cylinder is read on a reacting dial scaled from 0 to 100. The dial reading may be multiplied by a simple constant to obtain the indicated viscosity.

For positioning the cylindrical bob 21 at the correct level in the platinum crucible 23 within the furnace 17 the instrument 20 from which the bob is suspended may be raised or lowered within carefully calculated and adjustable limits. The mounting arrangement for providing this movement is shown in more detail in FIGURE 7. Instrument 20 has a horizontal arm 24 projecting through block 25 in which it is held, as selectively positioned longitudinally, by a set screw 26. The mounting block 25 is turnable on a horizontal axis about the shaft of a locking screw 27 to a preferred setting at which it is held against the vertical positioning block 28 by tightening the locking screw 27.

Block 28 is slidable upon the vertical rod 29 between collars 31 and 32 fixed thereto and is held in position by the locking bolt 33. Rod 29 in turn is shiftable vertically for a quarter of an inch by turning the adjusting nut 34 upon the upper threaded end of rod 29. The vertical movement of rod 29 is guided by aligned holes in arms 36 and 37 of the supplemental bracket 39 attached to bracket 22. The scope of this movement of rod 29 is limited upwardly by the abutment of collar 31 against the bracket arm 36 and downwardly by collar 32 coming against bracket arm 37.

Tightening of lock nut 41, which is threaded upon the upper end of rod 29, holds the rod in the selected position. The pin 43, which projects laterally from the lower end of the rod into a slot 45 in leg 46 depending from bracket arm 37, serves to prevent turning of the rod.

The spindle 49 of the bob 21 has a small bail 52 at its upper end by which it is hung through a wire 53 to the projecting shaft 54 of the instrument 20.

The weight of the upper terminal portion of the furnace 17 is carried by the bracket 22 through the tensioned coil spring 55 extending down from the anchoring bolt 56 projecting from the depending leg 46 of the lowermost arm 37 of the supplemental bracket 39. The lower end of the spring is secured to an anchoring bolt 58 on the upright 59 of the upper conductor bracket 60. The latter is connected by a cable 61 to the bus-bar terminal 62 fastened to the side of cabinet 15 above terminal 19. The copper conductor bracket 60 is bolted upon the end of the conductor plate 65 projecting from the top of the furnace assembly 17.

As illustrated in FIGURES 2 through 5, the crucible 23, which is heated as a resistor, is generally of cylindrical shape, and has in this example an inner diameter of one inch and an overall length of nine inches. The sample body of molten glass is restricted to the midsection of the crucible in the region of the radial fins 67 as shown in FIGURE 2. This midsection is closed at its lower end, except for the central draining passage, by the flared top portion 69 of the drain tube 71. The latter is integrated with the cylindrical crucible 23 by being welded thereto at the periphery of the flared top 69. A porcelain sillimanite core 73 held in place with Alundum cement separates the tube 71 from the lower skirt section of the crucible.

Like retaining flanges 75 and 76 are located at the upper and lower ends of the crucible 23. These are repeatedly bifurcated, resulting in the flanges being formed of a series of rectangular petal sections 78 as illustrated in FIGURES 3, 4 and 5.

Each flange is clamped between a two part, diametrically divided inner plate 80 and an outer flat ring 82. Studs 84 from the halves of the inner plate 80 extend through holes in the rings 82 and also through the upper exterior conductor plate 65 and the lower exterior conductor plate 86. These elements are held together by nuts 88 threaded down upon the projecting studs 84.

Included in each assembly is an outer, arcuate spacer ring 90. Through the lateral opening or gap in this ring a copper cooling tube 92 for water is led around in the annular channel left between the inner ring 82 and the surrounding spacer ring 90. The exterior conductor plate at both the top and bottom of the furnace is also secured to the flat ring 82 and the spacer ring 90 by rivets indicated respectively at 94 and 95 in FIGURE 3. To prevent leakage of the granular insulating material packed in the furnace about the crucible, a split refractory disc 103 is cemented against the inner side of flange 76. This seals the apertures between the petal sections 78.

The furnace 17, which has a diameter in this embodiment of nine inches and is ten inches high, has an outer brass casing 97. Fitted into the upper end of casing 97 is the refractory edge covering 100. A similar annular cover 102 is likewise inserted to the extent of a peripheral shoulder into the bottom of the casing 97. These covers of asbestos reinforced concrete are held in place and in fixed spaced relation by a pair of the tie rods 104 and 105 and nuts associated therewith. For the purpose of illustration, the tie rod 104 has been moved ninety degrees out of position in FIGURE 2.

Interiorly, nuts 107 and 108 on the rods abut the inner faces of the refractory covers. The exterior nuts 109 are threaded down upon the rods against the upper cover 100 while lower nuts 110 overly clamp elements 113. These have lateral fingers which press against and confine the lower conductor plate 86 with the parts assembled therewith.

It should here be noted that the assembly of the upper conductor plate 65 and the members 80 and 82, between which the upper flange 75 of the crucible 23 is clamped, is suspended from spring 55 and is thus supported independently from the balance of the furnace. This arrangement is essential as the crucible expands and elongates when heated, and the walls of the crucible would buckle should both ends be held in a fixed relation. With the separate suspension and the flexible conductor 61, the upper terminal assembly is thus able to rise upon elongation of the crucible.

A water-cooled needle valve 115 composed of a platinum alloy normally seals the outlet of drain tube 71 from the crucible 23 through which a charge of molten glass is evacuated after being tested. A platinum alloy with ten percent rhodium is considered most serviceable as the composition of not only drain valve 115 but also of the bob 21 and crucible 23. Other alloys and straight platinum withstand the corrosive effect and high temperature of the glass quite as effectively. Rigidly fixed to the lower extension 118 of the valve is a flat frame 119 vertically slidable and horizontally pivotable upon rod 120. This rod is fixed in position by being welded through a nut at its upper end to a stud nut 88.

Valve 115 is held in closed position by the action of spring 121 and is opened by downward movement, forcing frame 119 against this spring; the valve is then swung away to avoid the molten glass flowing from the crucible outlet. An annular insulating brick 122 is carried by the valve 115 on a spring 123 which lightly holds the brick against the furnace when the valve is in closed position.

A removable split brick 124 is located for insulation at the top of the crucible. The elements 122 and 124 are preferably formed of a standard 2800° F. insulating brick coated with Alundum cement.

To reduce the temperature of needle valve 115, cooling water is directed up near the tip of the valve through an inner tube receiving water from the inlet 125 at the end of the lower extension 118 of the valve. This water flows back from the tip on the outside of the inner tube to the outlet 126.

Water reaches the inlet 125 through hose 127 from a water supply header 128, and water from the outlet 126 is delivered by hose 130 to the drain header 132, as may be seen in FIGURE 1.

Water for cooling the conductor elements at the top and bottom of furnace 17 arrives from the supply header 128 through hose 134. This hose is fastened to one end of the cooling tube 92 in the top assembly of the furnace and is directed by a connection 136 from the other end 92a of said tube 92 to the like tube 92 at the bottom of the furnace. From the second tube 92 the water runs through hose 138 to cool the terminal blocks 19 and 62. This cooling of the terminal blocks is only necessary when the capacity of the transformer unit involved is taxed by the current load. From the blocks the water travels through hose 140 to the drain header 132. The concrete covers 100 and 102 are grooved to provide channels for the straight ingress and egress sections of tube 92.

A thermocouple 142 is welded to the outer wall of the midsection of the crucible 23 and extends outwardly through the calcined alumina insulating material 144 with which the casing 97 is filled. The thermocouple 142 is connected by wires 145 through the receptable 146 to a cold junction and potentiometer; the resulting signal after a preliminary amplification is sent through a magnetic amplifier to a reactor associated with the temperature control apparatus in cabinet 15. The thermocouple preferably employs a platinum and platinum-rhodium couple.

A second thermocouple 150, by which the temperature of the molten glass surrounding the bob may be checked and recorded, is lodged within the bob 21 as illustrated in FIGURE 6. This has terminal wires 152 for periodic attachment to a potentiometer. The temporary connection is secured through clips on the line 154 leading to the potentiometer 153 as seen in FIGURE 1.

In preparing to make a viscosity test, with the bob 21 removed from the crucible and the capping block 124 reset in position, the temperature controller, which may be a Doelcam model made by Minneapolis-Honeywell, is adjusted to bring the crucible 23 up to the highest temperature of the series at which the viscosity is to be determined for developing a viscosity temperature curve. If only a single test temperature is involved, then the controller is set at that point.

In the disclosed system the crucible 23 serves as both a resistance heating element and the glass container. The crucible draws less than two kilovolt-amperes with power supplied by a transformer rated at 2.4 volt output, the transformer being a part of the temperature control equipment in cabinet 15. A simplified diagram of the circuit and elements involved is presented in FIGURE 10 in which the crucible 23 is identified as the heater.

The current reaches the crucible from transformer bus terminals 19 and 62 mounted on the side of the cabinet 15. The flexible connector 61 of braided copper joins the terminal 62 to the copper conductor bracket 60. The path of the current continues through the copper elements comprising the conductor plate 65, plate member 80 and ring 82, and by means of the two latter, between which the upper flange 75 of the crucible is clamped, through the crucible.

The electrical circuit is completed from the lower end of the crucible by the lower pair of clamping members 80 and 82 and the conductor plate 86 which is fastened to the conductor bracket 18 from terminal 19.

A simple tube when heated as a resistor is hottest in the center portion. To even out the temperature in this zone of the modified tube crucible 23, where the glass sample is contained, eight fins 67 are welded to the crucible tube as shown in FIGURE 4. These fins transfer heat laterally and longitudinally away from the hottest section and thus tend to equalize the temperature. The fins are also valuable from a strengthening standpoint in helping to maintain the critical shape and dimensions of the platinum crucible.

The maximum temperature, which may be as high as 2750° F., for purposes of explanation will be here taken to be the more usual temperature of 2400° F. As soon as the selected temperature is reached, as reported by the thermocouple 142, the two halves of the split insulating block 124 are removed to uncover the top of the crucible 23 to permit introduction of the glass sample.

With the specific design of the apparatus as herein disclosed the quantity of glass required for testing runs between seventy and eighty grams and is approximately seventy-five grams when the glass has a specific gravity between 2.5 and 2.6.

The glass stock, usually in the form of cullet, preferably should not be in pieces larger than one-half inch although the crucible will accommodate pieces close to one inch in diameter. Fine particles likely to cause seeds should be removed by screening, as seeds tend to give false measurements.

To minimize the possibility of injuring the platinum crucible, it is advisable to have the glass sample carefully introduced into the crucible with the aid of a stainless steel funnel such as depicted as 156 in FIGURE 8. If the properties of the glass to be tested are not fully known it is recommended that a quantity somewhat below the average quantity of seventy-five grams be initially placed in the crucible. After the introduction of this sample the split block 124 is replaced and time on the order of three minutes is allowed for the furnace to melt the glass and return to the set temperature of 2400° F.

The bob 21 may now be lowered into the crucible with its spindle attached by the bail 52 to the wire 53 from the viscometer 20. The insertion of bob 21 should be done very carefully as the crucible is softened by the heat and is easily marred. It is very important that the shape of the bob and spindle be thus protected from disfigurement in order to be certain of accurate performance. The bob in this instance has an extreme diameter of two-fifths of an inch leaving a clearance of only three-tenths of an inch between it and the crucible wall.

At this time the mounting should be raised to its maximum height with block 28 held against collar 31 by the locking bolt 33, and with rod 29 moved upwardly by adjusting nut 34 until collar 31 is against the underside of bracket arm 36.

Bob 21 is designed for immersion to a depth of precisely one and five-eighths inches while the level of the molten glass within crucible 23 should be quite exactly two inches above the flanged top of the drain tube 71, with an extreme tolerance from this level of one-eighth of an inch. The prescribed immersion depth and the glass level indicated should be fully complied with to insure reliable viscosity measurements.

The viscometer 20 and the suspended bob 21 are now slowly lowered by turning adjusting nut 34 and forcing rod 29 gradually downward. This slight descent is continued until bob 21 just contacts the surface of the molten glass. This contact may be determined by lightly swinging the bob spindle 49 and noting the damping of the swinging movement caused by the bob meeting the surface.

Another method of detecting this contact involves the arrangement presented in FIGURE 9. As there shown an electrical circuit 160 includes leads to the instrument 20 and the conductor bracket 60, and a flashing device 165. When bob 21 touches the surface of the glass, current in the line to the instrument 20 flows down wire 53 and spindle 49 and, by way of the glass, up crucible 23 through the clamping conductor elements and to bracket 60 to actuate the flasher 165. This equipment has been found to be very exact up to temperatures as high as 2480° F.

If the glass is not contacted within the one-quarter inch vertical travel of rod 29, the bob 21 must be removed for the calculated addition of glass stock and subsequent recovery of the selected temperature.

Again the bob is attached and slowly lowered from its original top position by adjusting nut 34. If the glass level is exactly at the prescribed two inch height above the top of the drain tube 71 the mounting has been preset to bring the bob 21 in contact with the glass at the midpoint of the allowed one-quarter inch movement of rod 29. Accordingly, should such contact be established at any other point of such movement the level of the glass will not be more than one-eighth of an inch from the optimum and such variation is judged to be acceptable.

With the approved level of the glass thus determined, locking bolt 33 is loosened and the viscometer reporting instrument 20 and bob 21 are lowered by letting block 28 move downwardly on rod 29 from collar 31 to abutment upon collar 32. This movement is exactly one and five-eighths inches, the desired depth the bob 21 is to be immersed in the molten glass. With the bob properly immersed and centered the mounting is clamped in a steadied condition by tightening of locking bolt 33 and lock nut 41. The insulating block 124 may now be set back in place.

The lead wires 152 from the thermocouple 150 within the bob 21 are at this time clipped to leads 154 from the potentiometer 153 to determine when a constant temperature has been reached. This ordinarily should not take more than twenty minutes from the time the glass sample has been placed in the crucible. However, should the molten glass still be seedy after this interval, additional holding time for fining will be required.

As soon as proper conditions are established, the lead wires 152 are detached from their connection with potentiometer 153, and the equipment is now ready for rotation of the bob by the viscometer instrument. The Brookfield model has been found particularly suitable with its scale reading from one to one hundred, and the rotational drive settable at speeds up to one hundred revolutions per minute. A rotational setting should be selected that gives a reading between twenty-five and seventy-five on the scale of the instrument for the glass sample being studied, although, with a possibility of some loss in accuracy, this range may be extended to between ten and one hundred on the scale. The recommended period of operation is fifteen minutes. This normally provides ample time for the furnace and glass to reach a temperature of equilibrium.

After the required time lapse, the instrument reading is first taken and then the rotational drive stopped. The leads 152 from the thermocouple 150 within the bob are next clipped to the wiring 154 to potentiometer 153. The glass temperature is conventionally determined by converting the E.M.F. registered by the potentiometer to degrees Fahrenheit.

After recording the instrument reading estimated to the nearest tenth of a division and recording the temperature finding, by regulation of the control apparatus, the temperature is set one hundred to one hundred and twenty-five degrees lower, or at any lesser or greater amount considered warranted for the particular analysis being made. However, in present practice the minimum increment is 50° and the maximum 200° F. With the release of the thermocouple from the potentiometer 153, the rotation of the bob is again initiated at a speed giving a reading in the preferred zone between twenty-five and seventy-five on the instrument scale. Another fifteen minute period of operation is allowed before a second record of data is made.

The procedure is preferably repeated at spaced temperature settings until a smooth curve may be charted from the collected information. The recommended practice involves the use of a graph by which the instrument speed and scale readings are converted to logarithmic viscosity figures. The log viscosity points obtained are then plotted versus the corresponding temperature recorded.

After completion of the readings the controller is turned up to 2650° F. in this instance to increase the fluidity of the particular molten test glass for drainage. The viscosity at this point should be about 100 poises. Such low viscosity facilitates the evacuating operation, although glass with viscosity as high as 400 or 500 poises may be emptied from the crucible. With different glass compositions the drainage temperature may be anywhere between 1200 and 2800° F.

After the furnace reaches the drainage temperature the platinum needle valve 115 is lowered and turned to a side position as indicated in dotted lines in FIGURE 2. The thin web of glass at the bottom end of the drain tube 71 thickened by contact with the water cooled needle valve softens quickly and the glass then flows readily from the crucible and is received in a drain bucket placed below the outlet. After the crucible has been fully drained the needle valve is carefully replaced so as to center the tip in the precise center of the drain tube.

The temperature should be reduced to 2500° F. before the bob is removed. This removal is accomplished by first raising the viscometer instrument and the suspended bob by moving the locking block 28 up against the upper collar 31. Because of the softening effect of the high temperature considerable precaution must be taken not to strike the bob against the crucible during the withdrawal of the bob.

With the removal of the bob the equipment is ready for testing a new sample of glass. Should there be a delay between tests the furnace may be held at an idling temperature of 2100° F. from which it may be raised to an operating temperature of 2400° F. in a matter of seven minutes.

In the event that the next glass to be tested is quite different from that for which a viscosity determination has just been finished, and it is desired to guard against any residue of glass in the crucible affecting the following test, a flushing sample of the new glass may be melted in the crucible and emptied therefrom. Through this procedure, which takes only ten minutes or so, any possible remnants of the old glass are removed.

Ordinarily the rotating viscometer instrument is kept running as much of the test period as possible to take advantage of any aid in promoting temperature uniformity provided by the stirring of the glass by the rotating bob.

Among the features which should be emphasized in final review of the invention are the crucible, drainage arrangement, and mounting structure. A principal characteristic of the crucible resides in the fact that it constitutes the container for the glass as well as being the heating element. The compact size of the crucible enables it to be heated rapidly and to require only a small sample of the test glass. The shape of the crucible and the reinforcing fin structure contribute to the even temperature of the crucible and of the glass sample. The small resistor type crucible also requires much less of the costly platinum component than did the former wire-wound furnaces.

The long narrow insulated drain passage with the water-cooled drain valve at its lower end facilitates rapid release of a tested sample while curtailing any interference from the cooled needle with heat maintenance of the crucible.

Important maintenance savings are secured through the apparatus of this invention compared to prior test furnaces since these earlier designs required special cleaning procedures and their crucibles and bobs had to be submitted to frequent reshaping operations.

The separate suspension support of the upper terminal assembly and the crucible is also a valuable feature as it compensates for expansion of the crucible when heated and therethrough prevents disfigurement of this element.

Because of the increase in speed in determining the viscosity of a sample, a single furnace of the new design will serve in place of three of the old style. The subject apparatus also is much more precise in results, has better temperature control, less difficulty with temperature lag, and less chance of chemical change in the samples through volatilization losses. The pair of thermocouples, the exact control of immersion provided by the bob mounting, and the efficient temperature control apparatus all contribute to these improved results.

The temperature response of this apparatus is sufficiently rapid to make it a very satisfactory part of automatic equipment for plotting a temperature-viscosity curve on a recorder. An attendant would then be necessary only to add test samples.

Various modifications in the arrangement and design of the elements of the particular embodiment herein disclosed may, of course, be made without departing from the scope of the invention particularly as defined in the following claims.

I claim:

1. Apparatus for determining the viscosity, at definite temperatures, of glass in a molten state including a furnace, a cylindrical crucible for holding a sample of glass within the furnace, means for heating the crucible as a resistor in an electrical circuit to a selected temperature in the molten range of the glass, a bob adapted for immersion in the molten glass, means for rotating the bob in the molten glass, means for determining the viscosity of the glass through the resistance by the molten glass to such rotation, laterally extending flanges on the upper and lower ends of the crucible, and crucible-supporting members between which said flanges are clamped, said members also acting as conductors directing electrical current through the crucible.

2. Apparatus for determining the viscosity, at definite temperatures, of glass in a molten state including a furnace, a cylindrical crucible for holding a sample of glass within the furnace, means for heating the crucible as a resistor in an electrical circuit to a selected temperature in the molten range of the glass, a bob adapted for immersion in the molten glass, means for rotating the bob in the molten glass, means for determining the viscosity of the glass through the resistance by the molten glass to such rotation, insulating material placed in surrounding relation to the crucible and heat distributing fins projecting into the insulating material from the center portion of the crucible.

3. Apparatus for determining the viscosity at definite temperatures of glass in a molten state including a furnace, a cylindrical crucible for holding a sample of glass within the furnace, heat insulating material in surrounding relation to the crucible, means for heating the crucible to a selected temperature in the molten range of the glass, a cylindrical bob adapted for immersion in the molten glass, means for rotating the bob in the molten glass and means for determining the viscosity of the glass through the resistance by the molten glass to such rotation, said crucible having a lower, tubular extension, said extension being restricted in diameter and constituting a draining outlet for molten glass from the crucible and there is a withdrawable needle valve normally positioned in sealing relation against the outer end of said extension.

4. Apparatus according to claim 3 in which a cylindrical skirt portion of the crucible surrounds the tubular extension and there is insulating material between the skirt portion and the tubular extension.

5. Apparatus according to claim 3 in which the needle valve is internally passaged for a liquid coolant.

6. Apparatus according to claim 3 in which there is a retractable and laterally swingable mounting for the needle valve by which the needle valve may be withdrawn from the sealing position against the outer end of the extension, and swung away therefrom to avoid molten glass being emptied from the crucible.

7. Apparatus according to claim 3 which includes an annular insulating brick carried by the mounting in surrounding relation to the needle valve, and a spring on the mounting which inclines the insulating brick against the lower end of the crucible when the needle valve is in sealing position.

8. Apparatus for determining the viscosity at definite temperatures of glass in a molten state including a furnace, a cylindrical crucible for holding a sample of glass within the furnace, means for heating the crucible to a selected temperature in the molten range of the glass, a cylindrical bob adapted for immersion at a preferred definite depth in the molten glass, means for rotating the bob in the molten glass, means for determining the viscosity of the glass through the resistance by the molten glass to such rotation, and mounting means for the bob adapted to permit gradual lowering of the bob until the point is reached where the bob contacts the surface of the molten glass and said mounting means being then movable downwardly for a definite distance against a fixed stop, said definite distance being equal to the said preferred definite depth, whereby the mounting means may then be lowered to said stop to immerse the bob in the molten glass to the preferred depth.

9. Apparatus according to claim 8 in which there are means giving an electrically actuated signal when the bob contacts the surface of the molten glass.

10. Apparatus according to claim 8 in which the mounting means includes a vertical rod, a block from which the bob is supported, said block being slidable upon the rod, stop elements on the rod limiting the movement of the block thereon to said definite distance, releasable means first holding the block in position at the upper limit of its movement on the rod, and independent means for gradually moving the rod and the block carried thereby downwardly to bring the bob into contact with the surface of the molten glass, whereby after such contact the block may be released and moved downwardly to immerse the bob to the preferred definite depth.

11. Apparatus for determining the viscosity at definite temperatures of glass in a molten state including a furnace, a cylindrical crucible for holding a sample of glass within the furnace, means for heating the crucible as a resistor in an electrical circuit to a selected temperature in the molten range of the glass, a bob adapted for immersion and rotation in the molten glass, means for determining the viscosity of the glass through the resistance by the molten glass to such rotation, an upper supporting bracket fastened to the top of the furnace and a lower supporting bracket fastened to the bottom of the furnace, said brackets serving as conductors in an electrical circuit through the crucible.

12. An apparatus according to claim 11 in which the lower bracket is rigidly mounted and there is a spring by which the upper bracket is independently suspended.

13. Apparatus for determining the viscosity at definite temperatures of glass in a molten state including a furnace, a cylindrical crucible for holding a sample of glass within the furnace, means for heating the crucible as a resistor in an electrical circuit to a selected temperature in the molten range of the glass, a cylindrical bob adapted for immersion in the molten glass, means for rotating the bob in the molten glass, and means for determining the viscosity of the glass through the resistance by the molten glass to such rotation, said means for heating the crucible including a thermocouple in contact with the crucible, a cold junction for the thermocouple, a magnetic amplifier receiving the current signal from the cold junction, a saturable core reactor associated with the magnetic amplifier and a heating transformer controlled by the reactor inducing current in the electrical circuit through the resistor crucible.

14. Apparatus for determining the viscosity at definite temperatures of glass in a molten state including a furnace, a cylindrical crucible for holding a sample of glass within the furnace, means for heating the crucible as a resistor in an electrical circuit to a selected temperature in the molten range of the glass, said means including an assembly of conductor elements attached to the upper end of the crucible and free of attachment with any other portion of the furnace, a bob adapted for immersion and rotation in the molten glass, means for determining the viscosity of the glass through the resistance by the molten glass to such rotation, a supporting bracket fastened to the bottom of the furnace, said bracket serving as a conductor in an electrical circuit through the crucible, and a separate independent resilient support for the assembly of conductor elements whereby, upon elongation of the crucible through expansion when heated, the resilient support permits such elongation upwardly independently of the mounting of the furnace upon the lower supporting bracket.

References Cited in the file of this patent

UNITED STATES PATENTS

| | | |
|---|---|---|
| 2,255,578 | Baker | Sept. 9, 1941 |
| 2,266,733 | Bays et al. | Dec. 23, 1941 |
| 2,573,505 | Stiffens | Oct. 30, 1951 |
| 2,777,891 | Williams | Jan. 15, 1957 |